United States Patent Office 3,019,107
Patented Jan. 30, 1962

3,019,107
NOVEL PHOTOGRAPHIC PRODUCTS, PROCESSES AND COMPOSITIONS
Elkan R. Blout, Belmont, Milton Green, Newton Highlands, Howard G. Rogers, Weston, Myron S. Simon, Newton Centre, and Robert B. Woodward, Belmont, Mass., assignors to Polaroid Corporation, Cambridge, Mass., a corporation of Delaware
No Drawing. Filed Sept. 25, 1956, Ser. No. 612,051
7 Claims. (Cl. 96—66)

This invention relates to novel chemical compounds and more particularly to certain novel chemical compounds useful as photographic developing agents.

One object of this invention is to provide novel chemical compounds and suitable syntheses for their preparation.

Another object of this invention is to provide novel photographic developing agents and novel compositions for the development of silver halide emulsions.

Other objects of this invention will in part be obvious and will in part appear hereinafter.

The invention accordingly comprises the several steps and the relation and order of one or more of such steps with respect to each of the others, and the products and compositions possessing the features, properties and the relation of elements which are exemplified in the following detailed disclosure, and the scope of the application of which will be indicated in the claims.

For a fuller understanding of the nature and objects of the invention, reference should be had to the following detailed description.

The novel compounds of this invention may be represented by the formula:

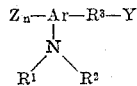

wherein $R^1$ and $R^2$ may be the same or different and may be hydrogen or alkyl, preferably lower alkyl such as methyl or ethyl; $R^3$ is an alkylene group, preferably an alkylene group containing no more than five carbons and more preferably an ethylene ($-CH_2CH_2-$) group; Ar is an aryl nucleus, such as a benzene or naphthalene nucleus, each Z is an alkyl group, preferably lower alkyl such as methyl or ethyl, or halogen, such as chlorine; $n$ is 0, 1 or 2; and Y is a 2,5-dihydroxy, a 2,3-dihydroxy or a 3,4-dihydroxy phenyl group which may be substituted by alkyl or halogen groups.

In the preferred embodiment, the aryl nucleus X is a benzene nucleus, and such compounds may be represented by the formula:

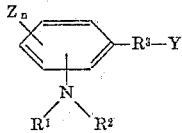

wherein Z, $n$, $R^1$, $R^2$, $R^3$ and Y have the same meaning as above.

The preferred compound of this invention is p-aminophenethyl-hydroquinone of the formula:

(I) 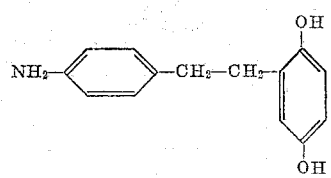

Another useful compound within the scope of this invention is:

(II) 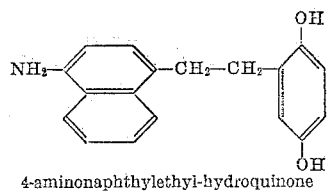

4-aminonaphthylethyl-hydroquinone

One method of preparing compounds within the scope of this invention is by condensing a suitable acid chloride of the formula:

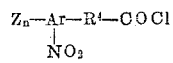

wherein $R^4$ is an alkylene group, Ar, Z and $n$ have the same meaning as above, e.g., nitrophenyl acetyl chloride, with a suitable dihydroxybenzene, which preferably has one hydroxyl group protected, e.g., monobenzyloxy-hydroquinone, rearranging the product by a Fries rearrangement to:

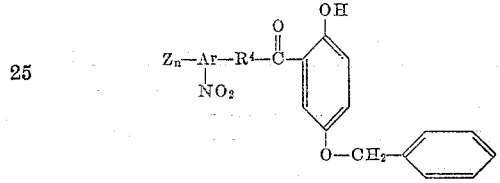

followed by reduction and removal of any protective group. If desired, the alkylene group $R^4$ may be omitted by using the acid chloride of the corresponding benzoic acid.

One may also prepare compounds within the scope of this invention by condensing a compound of the formula:

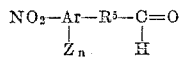

wherein Ar, Z and $n$ have the same meaning as above, and $R^5$ is a single valence bond or an alkylene group, with a suitably protected dihydroxyphenyl ketone, reducing the product and removing the protective groups.

Another method of preparing compounds within the scope of this invention, and particularly applicable to the preferred embodiment, comprises reacting an appropriate derivative of a dihydroxy aryl aldehyde, e.g., a dialkoxy or a diaryloxy derivative, with the appropriate compound of the formula:

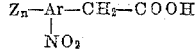

wherein Ar, Z and $n$ have the same meaning as above, after which the nitro group and the double bond of the product are reduced and the protective groups removed from the hydroxyl groups. If desired, one may use the free dihydroxy aryl aldehyde.

Where the secondary or tertiary amine derivatives are desired, the amino group may be suitably alkylated, preferably before removing the protective groups.

The following example illustrates the preparation of compounds within the scope of this invention and is given as an illustration only:

*Example 1*

A mixture of 100 g. of p-nitrophenyl acetic acid, 80 g. of 2,5-dimethoxy benzaldehyde and 20 cc. of piperidine is heated at 160° C. for 6 hours and allowed to cool overnight. The product is taken up in 100 cc. of acetic acid and poured into 500 cc. of water, giving a dark red oil. Supernatant liquid is decanted, and the oil is triturated with 100 cc. of ethanol. The resultant solid is filtered and crystallized from 2,000 cc. of ethanol, giving 52.5 g.

of 2,5-dimethoxy-4'-nitrostilbene in the form of red crystals melting at 114–116° C.

The above product is hydrogenated in 450 cc. of ethyl acetate using 15 g. of palladinized barium sulfate. The solvent is then evaporated off, giving p-(2,5-dimethoxyphenethyl)-aniline in the form of an oil.

The thus prepared p-(2,5-dimethoxy-phenethyl)-aniline is demethylated by refluxing under nitrogen in 500 cc. of 48% HBr for 4 hours. Excess HBr is then removed in vacuo, water added and the evaporation repeated. Ethanol is then added and the evaporation repeated again. The residual solid is dried over potassium hydroxide, giving 54.5 g. of p-aminophenethyl-hydroquinone hydrobromide in the form of a tan solid melting at 215° C.

Analysis of the product shows:

|  | C | H | N |
| --- | --- | --- | --- |
| Calculated | 54.2 | 5.2 | 4.5 |
| Found | 54.3 | 5.4 | 4.7 |

As noted previously, the novel compounds of this invention are useful as photographic developing agents. An example of a suitable photographic developer composition containing a compound of this invention and given for purposes of illustration only is:

*Example 2*

| Water | cc | 100 |
| --- | --- | --- |
| p-Aminophenethyl-hydroquinone | g | 0.6 |
| Sodium sulfite | g | 10 |
| Sodium hydroxide | g | 0.2 |

It will be apparent that the relative proportions of the novel developing agents and the other ingredients of the above developer composition may be varied to suit the requirements of one skilled in the art. Thus it is within the scope of this invention to modify the above developer composition by the substitution of preservatives or alkalies other than those specifically mentioned. It is also contemplated that where desirable the above developer composition may be modified by the inclusion of other common components of developer compositions such as restrainers, accelerators, etc.

When employed as photographic developing agents the novel compounds of this invention may be introduced in the form of the free base or as salts thereof, such as the hydrobromide. Thus the salt may be employed where the developing agent is to be incorporated in, on or behind the silver halide emulsion or where one desires to prepare a dry developer composition, the solvent being added to the dry composition prior to use. References in this specification and in the claims to the developing agents in the form of the free base are therefore intended also to include instances where the developing agent is introduced as a salt.

The novel developing agents of this invention are also useful in diffusion transfer-reversal processes, both dye and silver, and are especially useful in such photographic processes wherein it is desired to eliminate or minimize the need for washing or stabilizing operations in liquid baths subsequent to the formation of the silver print. Examples of such processes are disclosed in U.S. Patent No. 2,647,056 to Edwin H. Land. The utility of the developers of this invention, however, is by no means limited to diffusion-transfer reversal processes for they may be satisfactorily employed in conventional multi-stage and multi-bath photographic processing procedures either in black-and-white or color photography. Where the herein-disclosed novel developing agents are employed in diffusion transfer reversal processes of the type disclosed in the said patent to Edwin H. Land, the novel developer compositions of this invention may have incorporated therein as a further ingredient a silver halide solvent such as sodium thiosulfate. If the composition is to be applied to the emulsion by being spread thereon in a thin layer, it may also include a film-forming thickening agent such, for example, as a high molecular weight polymer, sodium carboxymethyl cellulose.

The novel compounds of this invention are also useful as antioxidants in petroleum products, etc. They are also useful as intermediates.

Since certain changes may be made in the above processes, products and compositions without departing from the scope of the invention herein involved, it is intended that all matter contained in the above description shall be interpreted as illustrative and not in a limiting sense.

What is claimed is:

1. As a novel photographic developer composition for the formation of silver transfer prints, an aqueous solution comprising an alkaline material, a silver halide solvent fixer and a compound selected from the group consisting of compounds within the formula:

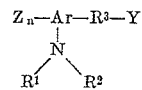

wherein $R^1$ and $R^2$ are each selected from the group consisting of hydrogen and alkyl groups, $R^3$ is an alkylene group, each Z is selected from the group consisting of alkyl and halogen groups, $n$ is selected from the group consisting of 0, 1 and 2, Ar is an aryl nucleus and Y is selected from the group consisting of unsubstituted, alkyl-substituted and halogen-substituted 2,5-dihydroxyphenyl, 2,3-dihydroxyphenyl and 3,4-dihydroxyphenyl groups.

2. A novel photographic developer composition for the formation of silver prints as defined in claim 1, wherein Ar is a benzene nucleus.

3. A novel photographic developer composition for the formation of silver prints as defined in claim 1, including a film-forming thickening agent.

4. As a novel photographic developer composition for the formation of silver transfer prints, an aqueous solution comprising an alkaline material, a silver halide solvent fixer and p-aminophenethyl-hydroquinone.

5. A method of developing a silver halide emulsion which comprises treating an exposed silver halide emulsion containing a latent image with an aqueous solution, containing an alkaline material and a compound selected from the group consisting of compounds within the formula:

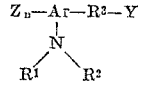

wherein $R^1$ and $R^2$ are each selected from the group consisting of hydrogen and alkyl groups, $R^3$ is an alkylene group, each Z is selected from the group consisting of alkyl and halogen groups, $n$ is selected from the group consisting of 0, 1 and 2, Ar is an aryl nucleus and Y is selected from the group consisting of unsubstituted, alkyl-substituted and halogen-substituted 2,5-dihydroxyphenyl, 2,3-dihydroxyphenyl and 3,4-dihydroxyphenyl groups, for a sufficient time to develop the latent image to a silver image.

6. A method as defined in claim 5, wherein Ar is a benzene nucleus.

7. A method of developing a silver halide emulsion which comprises treating an exposed silver halide emulsion containing a latent image with an aqueous solution, containing an alkaline material and p-aminophenethyl-hydroquinone, for a sufficient time to develop the latent image to a silver image.

References Cited in the file of this patent

UNITED STATES PATENTS

| 2,118,493 | Coffey et al. | May 24, 1938 |
| --- | --- | --- |
| 2,206,126 | Schinzel | July 2, 1940 |
| 2,515,147 | Wasley | July 11, 1950 |
| 2,560,555 | Condit | July 17, 1951 |
| 2,610,122 | John et al. | Sept. 9, 1952 |
| 2,698,244 | Land | Dec. 28, 1954 |